No. 675,535. Patented June 4, 1901.
L. D. WOODRUFF.
FLUID PRESSURE COUPLING.
(Application filed Feb. 2, 1901.)
(No Model.) 2 Sheets—Sheet 1.
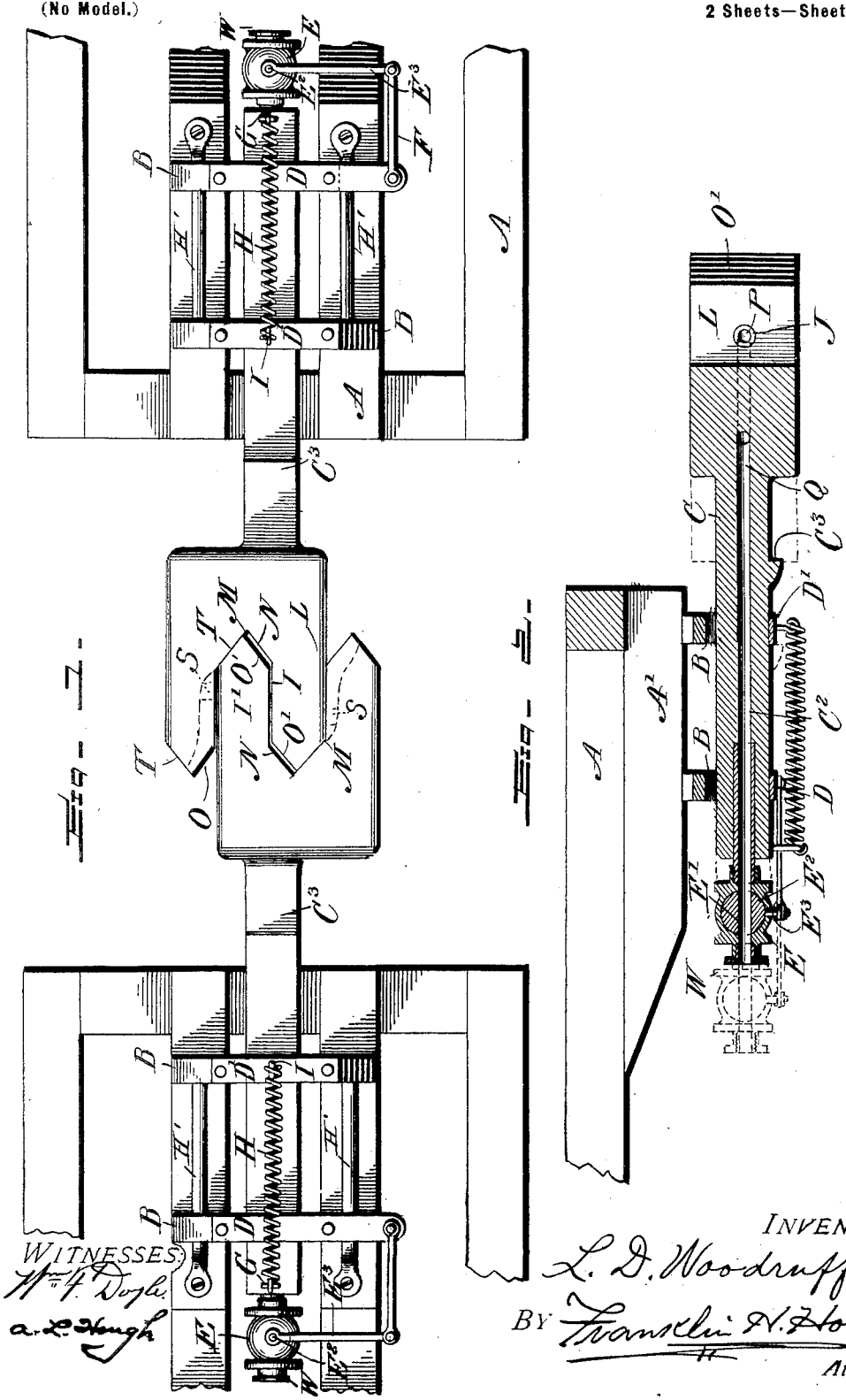
INVENTOR
L. D. Woodruff,
BY Franklin H. Hough
Attorney

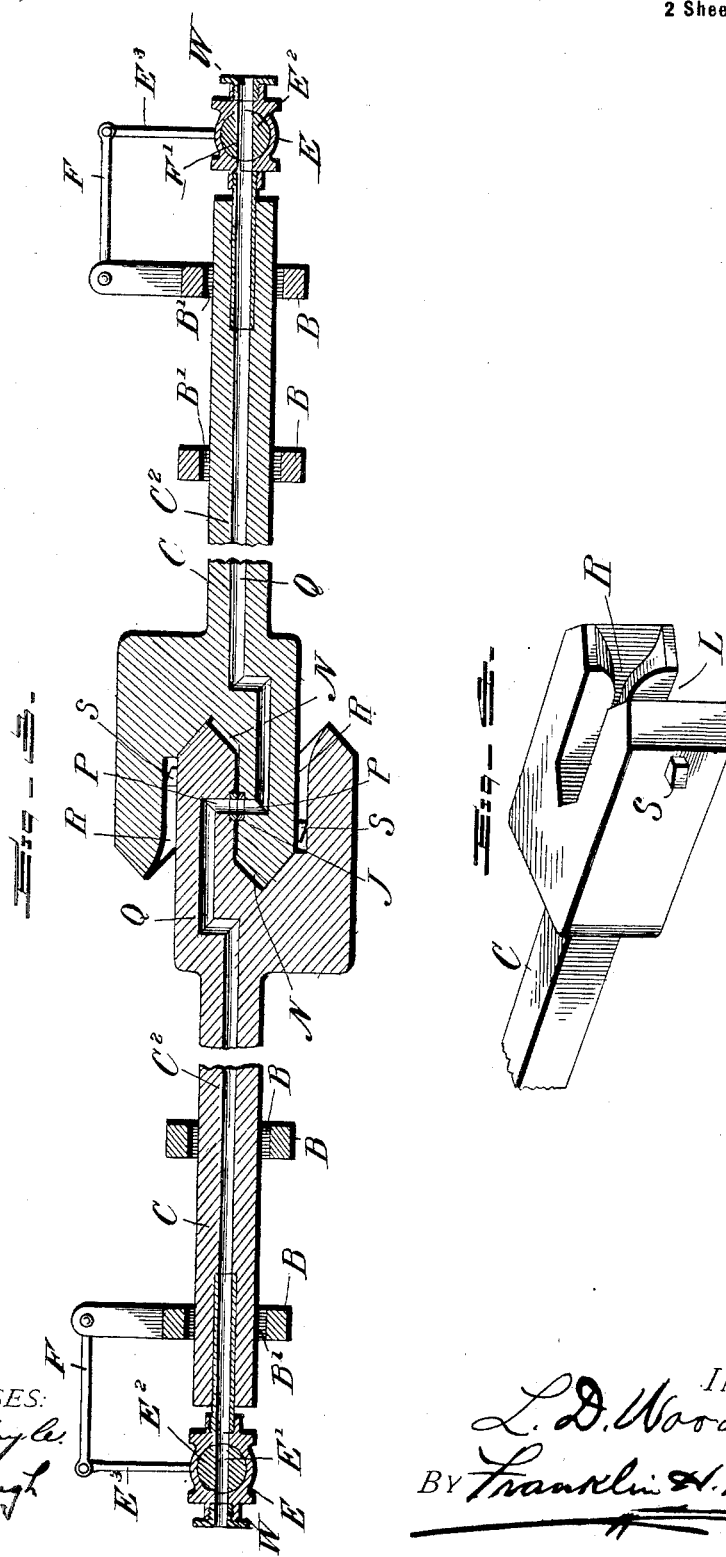

UNITED STATES PATENT OFFICE.

LEONIDAS DOAN WOODRUFF, OF JACKSON, MISSISSIPPI.

FLUID-PRESSURE COUPLING.

SPECIFICATION forming part of Letters Patent No. 675,585, dated June 4, 1901.

Application filed February 2, 1901. Serial No. 45,765. (No model.)

*To all whom it may concern:*

Be it known that I, LEONIDAS DOAN WOODRUFF, a citizen of the United States, residing at Jackson, in the county of Hinds and State of Mississippi, have invented certain new and useful Improvements in Fluid-Pressure Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in couplers which are especially adapted for use in connection with air-brake systems on cars; and it consists in the provision of couplers which are adapted to automatically interlock and become connected when two couplings of similar construction carried near the ends of two adjacent cars come together and interlock.

More specifically, the invention consists in the provision of a sliding spring-actuated air-pipe coupling having a valve therein which is automatically closed as the pipes are uncoupled, each coupler having a head which is adapted to interlock with the head of a second coupler and form an air-tight connection when two cars with couplers similarly equipped come together and are coupled.

The invention will be hereinafter more fully described and then specifically defined in the appended claims and is illustrated in the accompanying drawings, which, with the letters of reference marked thereon, form part of this application, and in which drawings similar letters of reference indicate like parts throughout the several views, and in which—

Figure 1 is a bottom plan view of the trucks of two cars, showing my improved couplers held thereto and interlocked. Fig. 2 is a central vertical section through the coupler longitudinally. Fig. 3 is a horizontal longitudinal section through the coupler, and Fig. 4 is an enlarged detail view in perspective of one of the coupler-heads.

Reference now being had to the details of the drawings by letter, A designates the bottom of a car, having beams or sleepers A' thereon, to the under faces of which are secured the yokes B, which are notched, as at B', to form guides, through which the hollow shank portion C of the coupler is adapted to reciprocate. Said shank portion C is held in said notches by means of the cross-pieces D and D', which are secured in any suitable manner to the lower ends of said yokes. Projecting from one end of the shank portion of the coupler is a valve-chamber E, which has a central aperture E' registering with the aperture $C^2$ in said shank portion of the coupler. Mounted in an aperture in said valve-chamber is a turning plug $E^2$, having an aperture which is adapted to register with the aperture E' in said chamber when turned in one position; but when said turning plug is partially rotated said aperture E' is adapted to be closed. Keyed or otherwise secured to the end of said turning plug is an arm $E^3$, on which one end of a link F is pivoted, the other end of said link being pivoted to the projecting end of the cross-piece D. Secured at one end to a lug G, projecting from the under surface of the shank portion of the coupler, is a coiled spring H, the other end of said spring being attached to a hook I, secured to the cross-piece D', which is held to the yoke B. In order to strengthen and make the yokes more rigid, the braces H' are employed, which are fastened to the lower edges of the yokes B and thence bent upward and secured to the under faces of the sleepers or beams A' on the under side of the truck of the car. The head of each coupler is made substantially of the shape shown in the drawings and is recessed, as at L, the inner margin of said recess terminating with the inclined surfaces M and N, while the outer walls of the recess are beveled or cut away, forming the inclined surfaces O and O'. Each coupling-head has a channel Q, which is a continuation of the channel $C^2$, passing through the hollow shank portion of the coupler. The entrance to the channel in the coupler-head is through one of the parallel side walls of the recess in the head, as at P, and in the opposite wall of the recess of the head is a channel or groove R, the outer side walls of which are cut away. This channel R is provided to receive a lug S on the outer face of an adjacent interlocking coupler-head. It will be observed that the ends of the coupler-head on either side of its central recessed portion are beveled or inclined, forming one surface T, which is adapted to contact with the inclined surface M of an adjacent interlocked coupler, whereby the surfaces I and I' will be snugly forced together, so as to form a tight coupling between the registering channels Q in the two coupler-heads. Each coupler-head has about the entrance into its channel Q a gasket J, the outer edge of which projects slightly beyond the wall I, so that when the two adjacent edges of the coupler come together the coupling will be air-tight. As the couplers come together and interlock the lug S on one of the couplers will register with and enter the channel R in the other head, which will insure the couplers coming into an interlocked relation in such a manner as to cause the two channels Q to register, as shown in the horizontal section taken longitudinally through the two interlocked couplers. The inclined edge O', it will be observed, terminates slightly in advance of the inclined surface N, a slight space intervening between the two to allow for wear between the abutting surfaces M and T.

In the under edge of the shank portion of the coupler is a notch $C^3$, which is adapted to engage over the cross-piece connecting the forward loop B when it is desired to hold the plug-valve so that the aperture therein will register with the channel or aperture in the shank portion of the coupler, which will allow air to freely pass through the valve-chamber. On a projecting portion of the valve-chamber is a nipple W, which is flanged to receive the end of a pipe which is to be connected thereto. This nipple is apertured and registers with the channel leading through said aperture.

It is my purpose to equip cars with couplers of the construction herein described and illustrated and so arranged that when a car thus equipped is coupled to cars which are not similarly equipped with air-couplings the couplers may be forced back so that the notch in the under edge of the shank portion of each coupler will engage over the cross-piece on the yoke, which will cause the valve to be in an open relation; but when two cars similarly equipped with coupling devices come together for connection the valves in the couplers are normally closed, and as the ends of the couplers interlock each coupler is driven back against the influence of the coiled spring, and when the heads of the couplers are interlocked the valves automatically open and the connection is complete. It is my purpose to utilize a car-coupler of any suitable construction which may be mounted in the space immediately above the air-couplers, a suitable place being provided immediately above the concaved portions of said yokes, and when the car-couplers are fastened together the air-couplings will be held in positions to insure the valves being kept open, so that an air-tight channel may be formed from one car to the other, as will be clearly understood.

It will be understood that when one of the couplers is caught and held back by the notch catching over the cross-piece on the yoke it will be automatically raised from this engaging relation when another coupler of similar construction comes into contact with the said coupler thus held back as the lug S strikes the inclined or curved wall of the channel of the other, thus causing the coupler to rise to a horizontal position, which is the normal position of each coupler when locked together.

Having thus described my invention, what I claim to be new, and desire to secure by Letters Patent, is—

1. In combination, a coupler having a head, which is recessed, the longitudinal walls of which recesses are parallel, the ends of the coupler beveled, a shank portion of the coupler having a valve-chamber with valve therein, a duct leading through said chamber, shank portion and head of the coupler, and passing through one of the parallel walls of the recess, the opposite parallel wall of the recess being grooved longitudinally, and a guide-pin mounted on the edge of an adjacent similarly-constructed coupler designed to register with and be guided in said groove as the heads interlock, the inclined wall at the end of the recesses adapted to contact with one of the beveled ends of the interlocked portions of the coupler, a gasket about the duct leading through the wall in the recesses of the coupler and means for opening the valve as the couplers interlock.

2. In combination with the yokes secured to the under surface of the car, said yokes being notched, the coupler having a shank portion adapted to reciprocate in said notches, and cross-pieces secured to said yoke and retaining the coupler within said notches, the valve-chamber, turning plug therein, lever-and-link connections between said turning plug and one of the coupler-retaining pieces, a spring connected at one end to a lug on the shank portion of the coupler, and its other end secured to a cross-piece on one of the yokes, the under edge of the shank portion of the coupler being notched, and adapted to engage over a cross-piece on one of the strips on which said shank portion slides.

In testimony whereof I affix my signature in presence of two witnesses.

LEONIDAS DOAN WOODRUFF.

Witnesses:
J. G. WOODRUFF,
E. A. BATTE.